(12) United States Patent
Segal et al.

(10) Patent No.: US 10,210,866 B2
(45) Date of Patent: Feb. 19, 2019

(54) AMBIENT ASSISTANT DEVICE

(71) Applicant: Essential Products, Inc., Palo Alto, CA (US)

(72) Inventors: Mara Clair Segal, San Francisco, CA (US); Manuel Roman, Sunnyvale, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/599,402

(22) Filed: May 18, 2017

(65) Prior Publication Data

US 2018/0211658 A1    Jul. 26, 2018

Related U.S. Application Data (60) Provisional application No. 62/448,919, filed on Jan. 20, 2017, provisional application No. 62/486,370, filed on Apr. 17, 2017, provisional application No. 62/486,378, filed on Apr. 17, 2017.

(51) Int. Cl.
| | |
|---|---|
| *G10L 15/22* | (2006.01) |
| *G10L 15/24* | (2013.01) |
| *G10L 25/78* | (2013.01) |
| *G06F 3/16* | (2006.01) |
| *G10L 15/30* | (2013.01) |
| *G10L 15/08* | (2006.01) |

(52) U.S. Cl.
CPC .............. *G10L 15/22* (2013.01); *G06F 3/167* (2013.01); *G10L 15/08* (2013.01); *G10L 15/24* (2013.01); *G10L 15/30* (2013.01); *G10L 25/78* (2013.01); *G10L 2015/088* (2013.01); *G10L 2015/223* (2013.01); *G10L 2015/226* (2013.01)

(58) Field of Classification Search
CPC ................................. G10L 15/22; G06F 3/167
USPC .................................................. 704/235, 275
See application file for complete search history.

(56) References Cited

U.S. PATENT DOCUMENTS

| | | | |
|---|---|---|---|
| 6,115,482 A | 9/2000 | Sears | |
| 6,243,683 B1 | 6/2001 | Peters | |
| 6,823,184 B1 | 11/2004 | Nelson et al. | |
| 8,527,278 B2 | 9/2013 | David | |
| 8,706,827 B1 * | 4/2014 | Noble | G10L 13/027 704/9 |
| 8,751,042 B2 | 6/2014 | Lee et al. | |
| 8,843,173 B2 | 9/2014 | Lee et al. | |
| 9,098,467 B1 | 8/2015 | Blanksteen et al. | |
| 9,153,106 B1 | 10/2015 | Kuscher et al. | |
| 9,542,941 B1 | 1/2017 | Weksler et al. | |

(Continued)

OTHER PUBLICATIONS

U.S. Appl. No. 15/599,407 of Segal, M. C. et al. filed May 18, 2017.

(Continued)

*Primary Examiner* — Jakieda R Jackson
(74) *Attorney, Agent, or Firm* — Perkins Coie LLP (57) ABSTRACT

Ambient assistance is described. An assistant device can detect speech in its environment and determine that the speech includes words or phrases of a local dictionary of the assistant device. The assistant device can then generate an interaction opportunity based on the words or phrases of the speech.

22 Claims, 5 Drawing Sheets

(56) References Cited

U.S. PATENT DOCUMENTS

| | | | |
|---|---|---|---|
| 9,569,742 B2* | 2/2017 | Puttaswamy Naga | ........................ H04L 41/0896 |
| 9,729,465 B2* | 8/2017 | Labocki | ................. H04L 47/70 |
| 2002/0105575 A1 | 8/2002 | Hinde et al. | |
| 2005/0165609 A1 | 7/2005 | Zuberec et al. | |
| 2009/0043580 A1 | 2/2009 | Mozer et al. | |
| 2012/0235896 A1 | 9/2012 | Jacobsen et al. | |
| 2013/0257716 A1 | 10/2013 | Xin et al. | |
| 2013/0325484 A1 | 12/2013 | Chakladar et al. | |
| 2014/0009609 A1 | 1/2014 | Webster et al. | |
| 2014/0012586 A1 | 1/2014 | Rubin et al. | |
| 2014/0164532 A1 | 6/2014 | Lynch et al. | |
| 2014/0244072 A1 | 8/2014 | Vaghefinazari et al. | |
| 2014/0245140 A1 | 8/2014 | Brown et al. | |
| 2014/0274211 A1 | 9/2014 | Sejnoha et al. | |
| 2014/0278443 A1 | 9/2014 | Gunn et al. | |
| 2014/0337036 A1 | 11/2014 | Haiut et al. | |
| 2014/0337048 A1 | 11/2014 | Brown et al. | |
| 2015/0106085 A1 | 4/2015 | Lindahl | |
| 2015/0130716 A1 | 5/2015 | Sridharan et al. | |
| 2015/0149177 A1 | 5/2015 | Kains et al. | |
| 2015/0154954 A1 | 6/2015 | Sharifi | |
| 2015/0199401 A1 | 7/2015 | Polehn et al. | |
| 2015/0254053 A1 | 9/2015 | Gardner et al. | |
| 2015/0348554 A1* | 12/2015 | Orr | ........................ G10L 17/22 704/275 |
| 2016/0077574 A1 | 3/2016 | Bansal et al. | |
| 2016/0162469 A1* | 6/2016 | Santos | .................... G10L 15/22 704/10 |
| 2016/0293168 A1 | 10/2016 | Chen | |
| 2016/0301802 A1 | 10/2016 | Kumar et al. | |
| 2016/0314782 A1* | 10/2016 | Klimanis | .............. G10L 15/065 |
| 2016/0351206 A1 | 12/2016 | Gelfenbeyn et al. | |
| 2017/0163435 A1* | 6/2017 | Ehsani | ................. H04L 12/282 |
| 2017/0173489 A1 | 6/2017 | Akavia et al. | |
| 2017/0195625 A1* | 7/2017 | Mahar | .................... H04N 7/147 |
| 2017/0197636 A1 | 7/2017 | Beauvais | |

OTHER PUBLICATIONS

Non-Final Office Action dated Aug. 11, 2017 for U.S. Appl. No. 15/599,407 of M. Segal, et al., filed May 18, 2017.

Final Office Action dated Mar. 9, 2018 for U.S. Appl. No. 15/599,407 of Segal, M. et al., filed May 18, 2017.

Matsuyama, Y. et al., "Framework of Communication Activation Robot Participating in Multiparty Conversation", AAAI Fall Symposium: Dialog with Robots, 2010, pp. 68-73.

Sidner, C.C. et al., "Explorations in Engagement for Humans and Robots", Artificial Intelligence166, Jan. 2, 2005, pp. 140-164.

Yonezawa, T. et al, "Evaluating Crossmodal Awareness of Daily-partner Robot to User's Behaviors with Gaze and Utterance Detection", Proceedings of the 3rd ACM International Workshop on Context-Awareness for Self-Managing Systems, ACM, 2009, 8 pages.

Notice of Allowance dated Aug. 15, 2018 for U.S. Appl. No. 15/599,402 of M. Segal, et al., filed May 18, 2017.

* cited by examiner

AMBIENT ASSISTANT DEVICE

CLAIM FOR PRIORITY

This application claims priority to U.S. Provisional Patent Application No. 62/448,919, entitled "Ambient Assistant Device," by Segal et al., and filed on Jan. 20, 2017. This application also claims priority to U.S. Provisional Patent Application No. 62/486,370, entitled "Ambient Assistant Device," by Segal et al., and filed on Apr. 17, 2017. This application also claims priority to U.S. Provisional Patent Application No. 62/486,378, entitled "Ambient Assistant Device," by Segal et al., and filed on Apr. 17, 2017. The content of the above-identified applications are incorporated herein by reference in their entirety.

TECHNICAL FIELD

This disclosure relates to ambient assistance, and in particular an ambient assistance device.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc.

In the smart home environment, this can also include home assistant devices providing an intelligent personal assistant to respond to speech. For example, a home assistant device can include a microphone array to receive voice input and provide the corresponding voice data to a server for analysis, for example, to provide an answer to a question asked by a user. The server can provide the answer to the home assistant device, which can provide the answer as voice output using a speaker. As another example, the user can provide a voice command to the home assistant device to control another device in the home, for example, a light bulb. As such, the user and the home assistant device can interact with each other using voice, and the interaction can be supplemented by a server outside of the home providing the answers. The home assistant device should be able to respond to the user in a satisfying manner.

SUMMARY

Some of the subject matter described herein includes a home assistant device, comprising: a speaker; a microphone; a display screen; one or more processors; and memory storing instructions, wherein the processor is configured to execute the instructions such that the processor and memory are configured to: detect first speech spoken within an environment of the home assistant device using the microphone; determine that the first speech includes content having one or more words or phrases corresponding to a local dictionary of the home assistant device; provide a first interaction opportunity with the home assistant device based on the one or more words or phrases of the first speech corresponding to the local dictionary, the first interaction opportunity providing a speech response using the speaker based on the content of the first speech; detect second speech spoken within the environment of the home assistant device, the first speech being different than the second speech; determine that the content of the second speech does not include one or more words or phrases corresponding to the local dictionary; provide the second speech to a cloud server to determine content related to the second speech; receive the response data from the cloud server based on the second speech; and provide a second interaction opportunity with the home assistant device based on the response data received from the cloud server, the second interaction opportunity different than the first interaction opportunity, the second interaction opportunity providing a visual response on the display screen based on the content of the second speech.

Some of the subject matter described herein also includes a method, comprising: detecting first speech spoken within an environment of an assistant device; determining, by a processor, that the first speech includes content having one or more words or phrases corresponding to a local dictionary of the assistant device; and generating a first interaction opportunity with the assistant device based on the one or more words or phrases of the first speech corresponding to the local dictionary.

In some implementations, the method includes detecting second speech spoken within the environment of the assistant device, the first speech being different than the second speech; determining that the second speech does not include one or more words or phrases corresponding to the local dictionary; providing the second speech to a cloud server to determine content or interactions related to the second speech; receiving the response data from the cloud server based on the content of the second speech; and generating a second interaction opportunity with the assistant device based on the response data received from the cloud server.

In some implementations, the cloud server is selected from among a first cloud server and a second cloud server based on the second speech, the first cloud server and the second cloud server corresponding to different services.

In some implementations, the cloud server is selected based on characteristics of the second speech, the characteristics including one or more of time, content, complexity, or time duration.

In some implementations, the first interaction opportunity includes providing additional information related to content of the first speech.

In some implementations, the local dictionary includes information related to translating portions of the first speech into text.

In some implementations, the local dictionary includes information related to commands capable of being performed by the assistant device.

In some implementations, the first interaction opportunity is a speech response responsive to the first speech, and the second interaction opportunity is a visual response responsive to the second speech.

Some of the subject matter described herein also includes an electronic device, including: one or more processors; and memory storing instructions, wherein the processor is configured to execute the instructions such that the processor and memory are configured to: detect first speech spoken within an environment of the electronic device; determine that the first speech includes content having one or more words or phrases corresponding to a local dictionary of the electronic device; and generate a first interaction opportunity with the electronic device based on the one or more words or phrases of the first speech corresponding to the local dictionary.

In some implementations, the processor is configured to execute the instructions such that the processor and memory are configured to: detecting second speech spoken within the environment of the electronic device, the first speech being different than the second speech; determining that the second speech does not include one or more words or phrases corresponding to the local dictionary; providing the second speech to a cloud server to determine content or interactions related to the second speech; receiving the response data from the cloud server based on the content of the second speech; and generating a second interaction opportunity with the electronic device based on the response data received from the cloud server.

In some implementations, the cloud server is selected from among a first cloud server and a second cloud server based on the second speech, the first cloud server and the second cloud server corresponding to different services.

In some implementations, the cloud server is selected based on characteristics of the second speech, the characteristics including one or more of time, content, complexity, or time duration.

In some implementations, the first interaction opportunity includes providing additional information related to content of the first speech.

In some implementations, the local dictionary includes information related to translating portions of the first speech into text.

In some implementations, the local dictionary includes information related to commands capable of being performed by the electronic device.

In some implementations, the first interaction opportunity is a speech response responsive to the first speech, and the second interaction opportunity is a visual response responsive to the second speech.

Some of the subject matter described herein also includes an electronic device, including: a computer program product, comprising one or more non-transitory computer-readable media having computer program instructions stored therein, the computer program instructions being configured such that, when executed by one or more computing devices, the computer program instructions cause the one or more computing devices to: detect first speech spoken within an environment of the computing device; determine that the first speech includes content having one or more words or phrases corresponding to a local dictionary of the computing device; and generate a first interaction opportunity with the computing device based on the one or more words or phrases of the first speech corresponding to the local dictionary.

In some implementations, the computer program instructions cause the one or more computing devices to: detect second speech spoken within the environment of the computing device, the first speech being different than the second speech; determine that the second speech does not include one or more words or phrases corresponding to the local dictionary; provide the second speech to a cloud server to determine content or interactions related to the second speech; receive the response data from the cloud server based on the content of the second speech; and generate a second interaction opportunity with the computing device based on the response data received from the cloud server.

In some implementations, the cloud server is selected from among a first cloud server and a second cloud server based on the second speech, the first cloud server and the second cloud server corresponding to different services.

In some implementations, the cloud server is selected based on characteristics of the second speech, the characteristics including one or more of time, content, complexity, or time duration.

In some implementations, the first interaction opportunity includes providing additional information related to content of the first speech.

In some implementations, the local dictionary includes information related to translating portions of the first speech into text.

In some implementations, the local dictionary includes information related to commands capable of being performed by the computing device.

In some implementations, the first interaction opportunity is a speech response responsive to the first speech, and the second interaction opportunity is a visual response responsive to the second speech.

DETAILED DESCRIPTION

This disclosure describes devices and techniques for a home assistant device to perform active assistance and/or passive assistance. In one example, active assistance can include an experience in which a home assistant device does not respond to voice input unless a hardware activation phrase indicating a user's desire to interact with the home assistant device is detected. For example, if a user says "Nessie, what time is it?" then "Nessie" can be a hardware activation phrase indicating that the user wants to know "what time is it?" By contrast, passive assistance can include an experience in which a home assistant device is listening to its sounds within its ambient environment and the home assistant device can provide interactions based on the sounds it detects without a hardware activation phrase being used. For example, if two people are discussing a new restaurant, the home assistant device can determine that a restaurant is being discussed based on their speech during the discussion. The home assistant device can then provide an interaction opportunity related to the restaurant being discussed, for example, a reservation can be booked using a user interface on a display screen of the home assistant device.

In another example, the home assistant device can also include a local dictionary representing words that it can detect using on-device local resources (e.g., the hardware capabilities of the home assistant device). If the local dictionary does not include words corresponding to the speech, then a cloud server can be contacted to process the speech and provide data indicating how the home assistant device can provide interaction opportunities. In some implementations, the type of interaction opportunity can vary based on whether the local dictionary was used. For example, if the local dictionary is used, then the interaction opportunity can include speech-based content (e.g., provided using a speaker of the home assistant device). However, if the cloud server was contacted, then the interaction opportunity can include visual-based content (e.g., content displayed on a display screen of the home assistant device). This might be done because contacting the cloud server can have an increased latency and, therefore, an interaction opportunity including speech-based content might be too late to provide meaningful information during a discussion. However, in other implementations, the interaction opportunity can be provided as speech-based or visual-based despite whether the location dictionary was used. Thus, the home assistant device can provide an enjoyable ambient experience for users.

Figure 1:
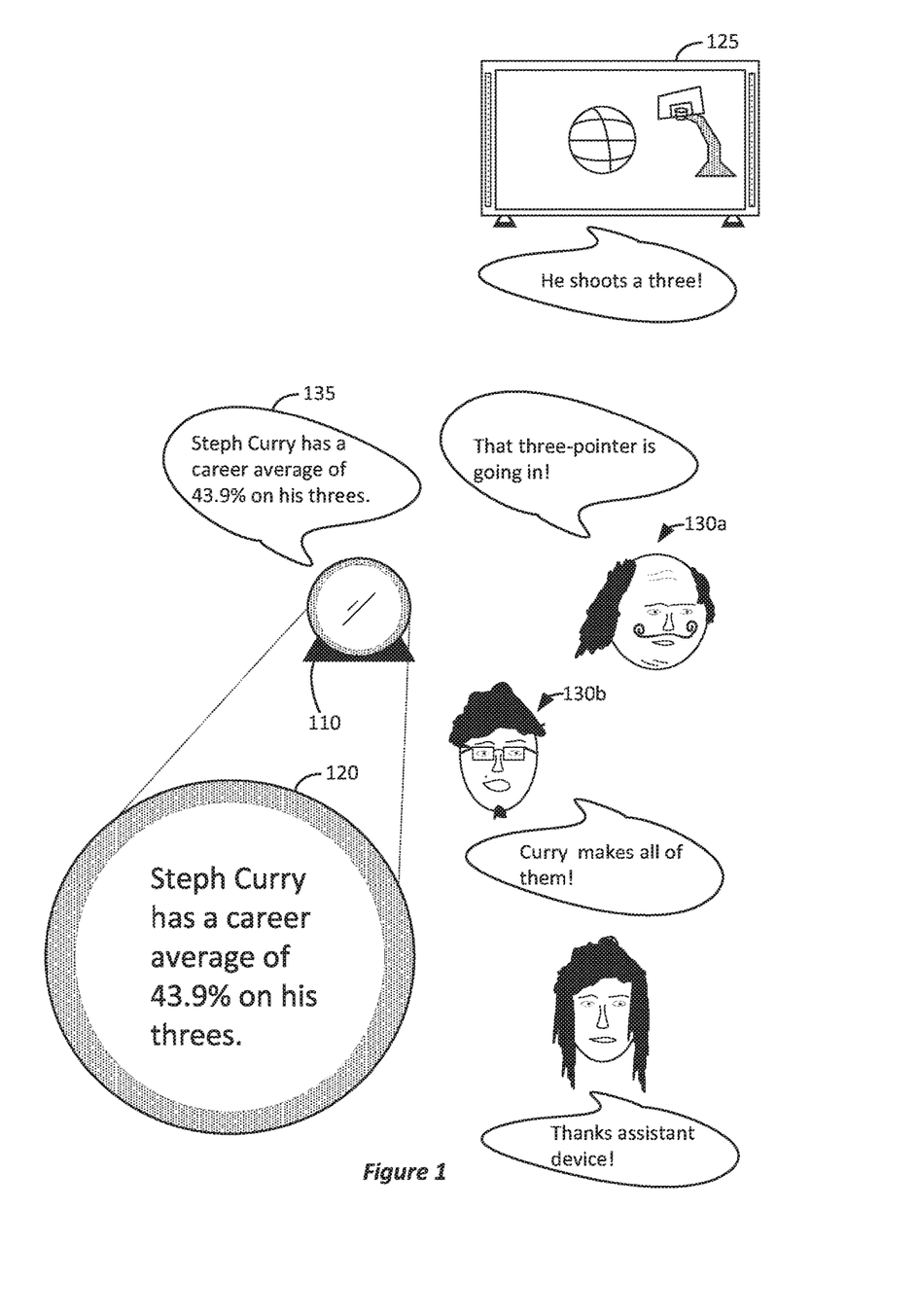
FIG. 1 illustrates an example of an assistant device providing an ambient experience.

In more detail, FIG. 1 illustrates an example of an assistant device providing an ambient experience. In FIG. 1, home assistant device 110 can include one or more microphones (e.g., a microphone array) to receive audio input and a speaker to provide audio output. The audio output can be in the form of speech or other types of sounds. In some implementations, home assistant device 110 can include a display screen, light emitting diodes (LEDs) and other lighting, and other visual components. In some implementations, home assistant device 110 can also include a camera or access a camera on a home's wireless network to also receive visual input.

Home assistant device 110 can process speech spoken in its vicinity or environment if a hardware activation phrase is spoken by a user and detected by home assistant device 110. As such, a user can signal to home assistant device 110 that speech including a question, comment, or command to home assistant device 110 should be following shortly, and therefore, the speech should be recorded and/or processed (e.g., provided to a cloud server to convert the speech to text and perform any processing based on the text). This can be active listening or active assistance. However, this requires the user to affirmatively request an interaction with home assistant device 110. In some situations, for example spontaneous events, users might be too excited to recite the hardware activation phrase. In other situations, users might not realize that home assistant device 110 can provide an interaction opportunity (e.g., an opportunity to interact with home assistant device 110) based on the speech. Therefore, with active assistance, many opportunities to interact with home assistant device 110 can be lost.

In FIG. 1, home assistant device 110 can include passive assistance. With passive assistance, home assistant device 110 can listen in on sounds in its environment without a hardware activation phrase being recognized or included in speech. That is, home assistant device 110 can listen in on sounds (including speech) constantly, or a significant amount of time, without an affirmative request from a user in the instant situation to provide an ambient listening experience. For example, in FIG. 1, it can be detected that users 130a and 130b are discussing a topic such as a basketball player shooting a three-point shot during a basketball game being watched on television. Home assistant device 110 can recognize sounds from television 125, user 130a, and/or user 130b and determine that the sounds provide speech which include a topic such as the basketball player Steph Curry shooting a three-point shot. Home assistant device can then provide information regarding the topic or content of the speech on user interface 120 (e.g., on a display screen) or it can provide audio output 135 (e.g., in the form of speech) regarding the topic. The information can be provided either using local resources of home assistant device 110, resources of a cloud server accessed via the Internet or other network connection, or both. In another implementations, home assistant device 110 can determine the content of a conversation among users 130a and 130b and provide the information related to the conversation (e.g., information regarding the topic or content of the speech that is provided on user interface 120 in the example above) to a mobile device of one of the users (e.g., by providing a text message to the phone number of the user's mobile phone).

In some implementations, if the other party incorrectly states something (e.g., says something factually incorrect), then home assistant device 110 can determine this and then send the correct information to the mobile device of one or both of the users.

In some implementations, home assistant device 110 can switch between providing active and passive experiences. For example, home assistant device 110 can operate to provide an active experience as a default mode, but switch to a passive experience upon the recognition of conditions or characteristics within its environment, or vice versa. For example, if a user or person is detected as looking at or towards home assistant device 110 (e.g., home assistant device 110 can use a camera to capture or generate image frames representing its environment including a person within it and analyze those image frames using image recognition), then home assistant device 110 can switch from the active experience to providing a passive experience. This can be done because the user is expected to want to interact with home assistant device 110 when he or she looks at it. In another example, characteristics of voice can be detected to determine that the speech of the voice was provided when the user was looking at home assistant device 110. For example, if the speech is determined to be coming from a direction oriented towards home assistant device 110, then this can be indicative of the user looking at home assistant device 110 or expecting a response from home assistant device 110. As a result, the recitation of the hardware activation phrase can be skipped.

In some implementations, the mode can switch between either of the two modes based on the number of people detected in the environment (e.g., either using a camera or detecting a unique number of voices), the activity performed by people in the environment (e.g., people watching television, listening to music, etc.), etc. For example, if many people are in the same environment as home assistant device 110, then it might provide an active experience due to the likelihood of many conversations ongoing with so many people. If an activity such as television watching or talking on a phone is determined, then home assistant device 110 can also provide an active experience because the user might not be expected to want to have an interaction opportunity due to their concentration being dedicated to another activity.

Figure 2:
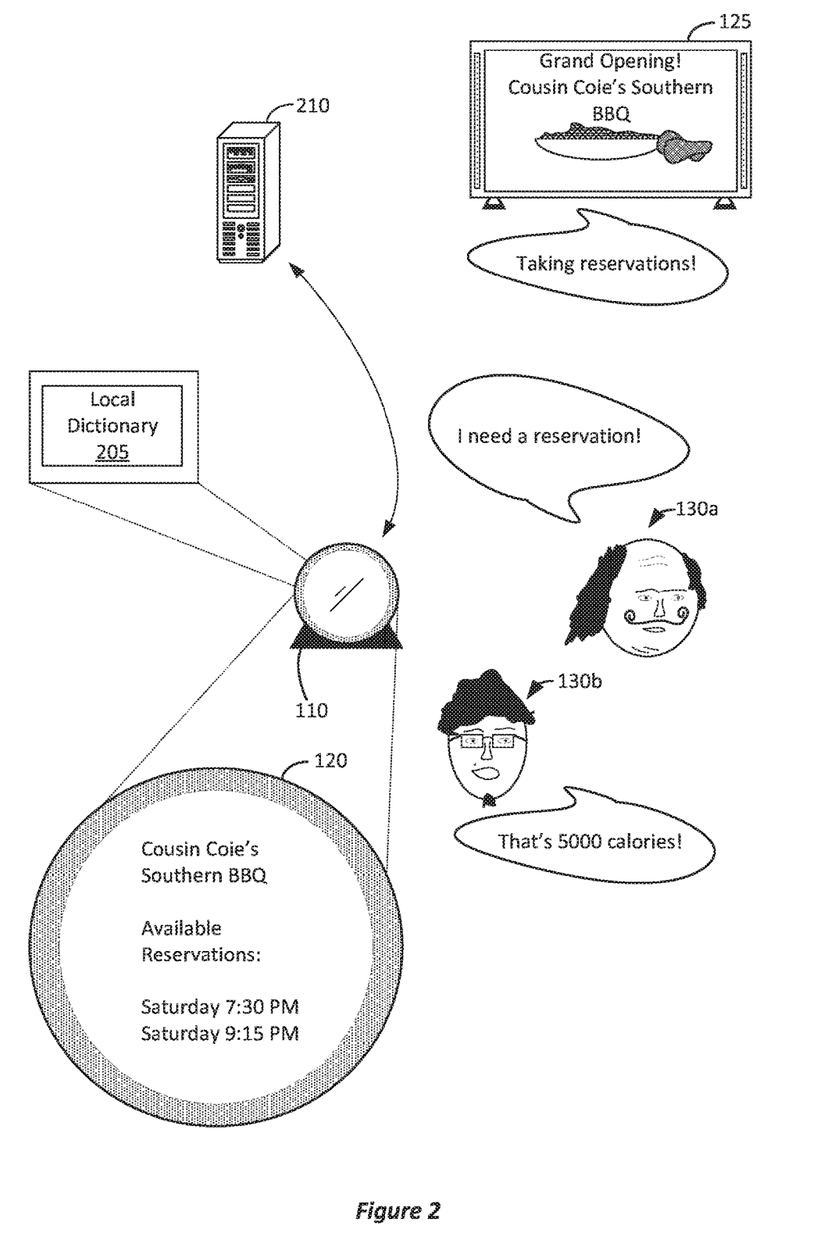
FIG. 2 illustrates another example of an assistant device providing an ambient experience.

FIG. 2 illustrates another example of an assistant device providing an ambient experience. In FIG. 2, users 130a and 130b can be discussing a restaurant advertised on television 125. Home assistant device 110 can recognize that a restaurant is being discussed and/or advertised on television 125 and provide reservation information for that restaurant on user interface 120. In some implementations, home assistant device 110 can contact a server of a service, for example a restaurant reservation placement service, to receive data to provide the reservation information on user interface 120. This provides an opportunity for users 130a or 130b to interact with home assistant device 110 based on their passive listening of their speech and a reservation can be completed using the service.

In some implementations, home assistant device 110 can communicate with television 125 to receive information regarding the context of what it is displaying or playing back. For example, home assistant device 110 can receive information representing that television 125 is playing an advertisement regarding a restaurant. Home assistant device 110 can then put the conversation between users 130a and 130b in some context and use that to provide a passive experience. This can also provide a prediction as to what users 130a and 130b might be discussing in the near future. For example, if home assistant device 110 is informed that a commercial regarding a restaurant is being played on television 125, then it can switch to a passive experience from an active experience and try to detect a key word using local dictionary 205, as discussed below. In some implementations, it can receive data for location dictionary 305 from a server (e.g., cloud server 210), and load that data so that it can be prepared to process and analyze the speech. For example, home assistant device 110 can inform cloud server 210 that an advertisement regarding the restaurant is about to be played back on the television and cloud server 210 can provide data to home assistant device 110 that can be used to determine the speech of users 130a and 130b.

In some implementations, home assistant device 305 can include local dictionary 205 which includes information regarding the recognition of key words or phrases that can enable a passive experience. The information provided by location dictionary 305 can be used to translate or recognize speech into text relatively quickly because it is on-device. Local dictionary can be used by home assistant device 110 to recognize a small set of words in speech (e.g., five hundred words, five thousand words, etc.). The small set of words might be used in speech in which providing an interaction opportunity can be useful or beneficial for a user. In the example of FIG. 2, local dictionary 205 might include data or functionality allowing for the recognition of words such as "restaurant" and "reservation" and therefore if users 130a or 130b state those words, home assistant device 110 can recognize that they were spoken and then provide information regarding a reservation for the restaurant, as depicted in FIG. 2.

However, if one or more of the words of the speech are not included in local dictionary 205, then home assistant device 110 can contact cloud server 210. Cloud server 210 can include more sophisticated functionality that can be used to understand more speech than local dictionary 205. Cloud server 210 can be a server that can receive speech data including the speech from home assistant device 110 and convert the speech to text and perform processing based on that text. For example, if users 130a and 130b are discussing the food in the advertisement without mentioning the restaurant or the words "restaurant" and "reservation" then cloud server 210 can determine that their speech is related to the restaurant and that they might want to make a reservation. As a result, cloud server 210 can then provide data to home assistant device 110 that it should provide the information on user interface 120 so that users 130a and 130b have the opportunity to interact with home assistant device 110 based on the content of their speech. Accordingly, home assistant device 110 can try to use local resources (e.g., its own capabilities, or the capabilities of other devices within the wireless network within the home) if the speech is recognized using local dictionary 205. However, if the speech is not recognized using local dictionary 205, then cloud server 210 can be provided the speech for analysis, as discussed. In some implementations, home assistant device 110 can use local dictionary 205 when it is operating in a passive experience mode, and use cloud server 210 when it is in both active and passive experience modes.

In some implementations, if local dictionary 205 is used to recognize speech to provide an interaction opportunity, then a speech-based response can be provided using a speaker of home assistant device 110. However, if cloud server 210 is used, then a visual-based response can be provided. A visual-based response can include displaying graphical or textual content in a graphical user interface (GUI) on the display screen of home assistant device 110. This can be done because contacting cloud server 210 for processing speech can have significant latency and, therefore, providing a speech-based response might be lagging behind the conversation between users 130a and 130b. However, providing a visual-based response that might be late to the conversation can be less of an annoyance. However, in other implementations, either speech-based or visual-based responses can be provided regardless of whether cloud server 210 or local dictionary 205 are used.

In some implementations, local dictionary 205 can include data representing commands for home assistant device 110 to perform. For example, using local dictionary 205, home assistant device 110 can determine that a command to turn on lights, adjust at thermostat, etc. in a connected home environment were requested.

In some implementations, home assistant device 110 can contact multiple cloud servers offering different services for processing a query (e.g., the speech provided by users 130a and 130b). For example, home assistant device 110 can perform some processing on-device using its own resources or resources of other devices within the home's environment, or contact two or more services via the Internet (e.g., services provided by different companies that can be accessible via different application programming interfaces (APIs)). The services might be associated with different cloud servers or clusters of servers. These different services might have different features, performance, etc. In some implementations, if speech should be sent to one of the other services, then home assistant device 110 can select one to be provided the speech based on a variety of factors including characteristics of the speech. For example, home assistant device 110 can provide the speech to a server based on the complexity of the speech, the duration in time of the speech, what was being played back on television 125, how many speakers are involved in the speech (e.g., how many speakers are speaking), etc. This can allow home assistant device 110 to provide the speech to the service that can offer a better experience for users.

Figure 3:
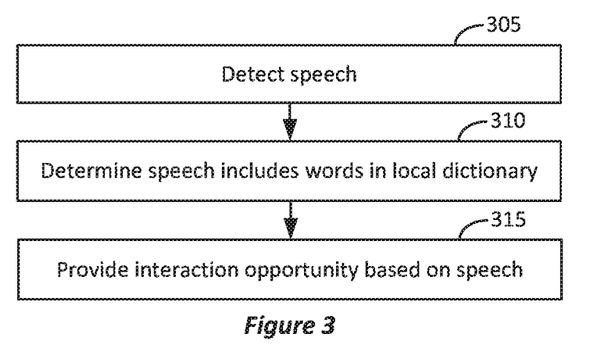
FIG. 3 illustrates an example of a block diagram of an assistant device providing an ambient experience.

FIG. 3 illustrates an example of a block diagram of an assistant device providing an ambient experience. In FIG. 3, at block 305, speech can be detected. For example, home assistant device 110 can detect people having a conversation in the same room. Next, at block 310, home assistant device 110 can determine that the speech includes vocabulary that it can detect using a local dictionary. For example, home assistant device 110 can include local dictionary 205 including data indicating how to detect certain key words or phrases. If the speech includes those key words or phrases, then at block 315, an interaction opportunity based on the speech can be provided. For example, home assistant device 110 can provide an interaction opportunity on a user interface based on the speech. As a result, home assistant device 110 can provide an opportunity for users to interact with it even when they did not directly intend to interact with home assistant device 110.

Figure 4:
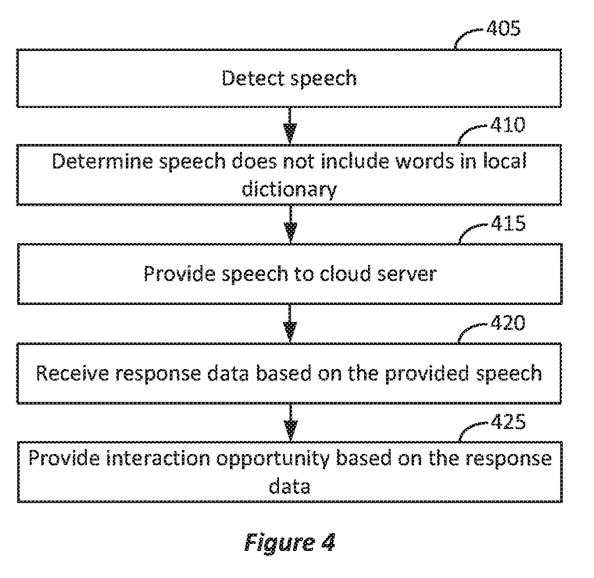
FIG. 4 illustrates another example of a block diagram of an assistant device providing an ambient experience.

FIG. 4 illustrates another example of a block diagram of an assistant device providing an ambient experience. In FIG. 4, at block 405, speech can be detected, as previously discussed. Next, at block 410, the speech might not include key words or phrases corresponding to the location dictionary. As a result, home assistant device 110 might not be able to understand the content of the speech. As such, at block 415, the speech can be provided to a cloud server. For example, speech data including the spoken speech can be provided to cloud server 210 as discussed in reference in FIG. 2. At block 420, the home assistant device can receive response data from the cloud server based on the speech. For example, cloud server 210 can translate the speech to text and then provide that text to home assistant device 110 or provide instructions to home assistant device 110 so that it can respond to the speech (e.g., provide a particular type of interaction opportunity). At block 425, the home assistant device can then provide an interaction opportunity based on the response data.

Figure 5:
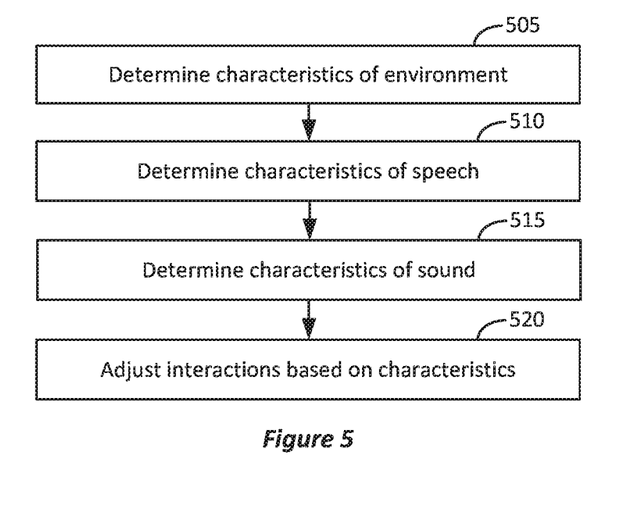
FIG. 5 illustrates a block diagram for adjusting interactions of an assistant device.

How home assistant device 110 provides interactions can be based on a variety of characteristics within its environment, the speech of conversations in its environment, or characteristics of sounds (e.g., of objects such as glass breaking rather than users speaking). FIG. 5 illustrates a block diagram for adjusting interactions of an assistant device. In FIG. 5, at block 505, characteristics of the environment can be determined. For example, home assistant device 110 can use a camera (either its own or one on the same wireless network within the home) to generate image frames regarding its physical environment. The image frames can be analyzed to determine activities occurring within the environment (e.g., people are playing a board game, people are watching television, etc.), the number of people in the environment, etc. These characteristics of the environment can be used to determine how home assistant device 110 should interact with users, or even interact at all. For example, as previously discussed, if many people are within the environment, then in some implementations home assistant device 110 might not provide any interaction opportunities, or might only provide visual interaction opportunities using its display screen rather than providing a speech response. This might be done because several conversations can be occurring at the same time and, therefore, speech responses from home assistant device 110 might be confusing as to which conversation it belongs to. Thus, if a threshold number of people are determined to be in the environment, then home assistant device 110 can recognize this and adjust its behavior. In some implementations, the time can be determined and used to adjust the behavior of home assistant device 110. For example, interaction opportunities late at night might not be wanted and, therefore, no interaction opportunities, or only visual interaction opportunities might occur.

At block 510, characteristics of speech can be determined. For example, if two users are having a conversation, the volume of the speech within that conversation can be used to determine whether to provide an interaction opportunity. If users are speaking at a low volume (e.g., below a threshold volume level), then this might indicate that the users are speaking about a private matter and, therefore, interaction with home assistant device 110 might not be wanted.

In another example, if two users are talking and pause and home assistant device 110 begins providing speech in response to the conversation, but one or both of the users begins to speak again, then home assistant device 110 might stop providing speech and even pause providing any sort of interaction opportunity for some threshold period of time (e.g., five minutes). In some implementations, if home assistant device 110 begins providing speech and a user begins speaking in a louder volume than before (e.g., during their conversation), then home assistant device 110 might stop providing speech and even pause providing an interaction opportunity for some period of time as well. In some implementations, the content of the speech of the users can be determined and used to stop providing a speech response or pause providing another interaction opportunity. For example, if a user begins swearing, this might be an indication of frustration or other type of negative state of mind of the user and this can result in stopping a response or pausing.

At block 515, characteristics of sound within the environment can be determined. For example, the presence of non-speech sounds such as glass breaking, doors creaking open, etc. can also be used to provide interactions. Similar characteristics, such as volume, etc. as discussed above can also be determined.

At block 520, the interactions provided by the home assistant device can be adjusted based on the characteristics. For example, as previously discussed, whether to provide an interaction opportunity or the type of interaction opportunity (e.g., speech or visual content on a display screen) can be determined. Other types of adjustments can include the speed of the speech to be provided, the volume of the speech, language of the speech, accent of the speech, etc.

In some implementations, users can have a profile with preferences regarding how home assistant device 110 should provide interaction opportunities. These preferences can be manually set by the user, learned via machine learning by home assistant device 110, or a combination of both.

Many of the aforementioned examples discuss a home environment. In other examples, the devices and techniques discussed herein can also be set up in an office, public facility, etc.

Figure 6:
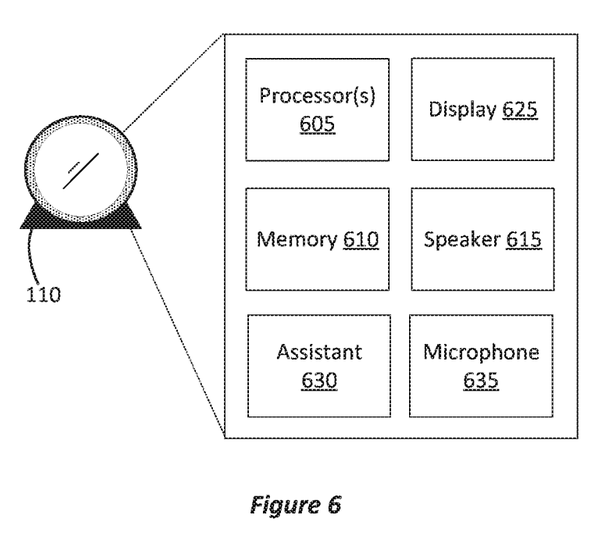
FIG. 6 illustrates an example of an assistant device.

In FIG. 6, assistant device 105 includes a processor 605, memory 610, touchscreen display 625, speaker 615, microphone 635, as well as other types of hardware such as non-volatile memory, an interface device, camera, radios, etc. to implement assistant logic 630 providing the techniques disclosed herein. Various common components (e.g., cache memory) are omitted for illustrative simplicity. The assistant device is intended to illustrate a hardware device on which any of the components described in the example of FIGS. 1-4 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A home assistant device, comprising:
a speaker;
a microphone;
a display screen;
one or more processors; and
memory storing instructions, wherein the processor is configured to execute the instructions such that the processor and memory are configured to:
detect first speech spoken within an environment of the home assistant device using the microphone;
determine that the first speech includes content having one or more words or phrases included in a local dictionary of the home assistant device;
provide a first interaction opportunity with the home assistant device based on the one or more words or phrases of the first speech corresponding to the local dictionary, the first interaction opportunity providing a speech response using the speaker based on the content of the first speech and based on the first speech including the content having the one or more words or phrases included in the local dictionary of the home assistant device;
detect second speech spoken within the environment of the home assistant device, the first speech being different than the second speech;
determine that the content of the second speech does not include the one or more words or phrases corresponding to the local dictionary;
provide the second speech to a cloud server to determine content related to the second speech;
receive response data from the cloud server based on the second speech; and
provide a second interaction opportunity with the home assistant device based on the response data received from the cloud server, the second interaction opportunity different than the first interaction opportunity, the second interaction opportunity providing a visual response on the display screen based on the content of the second speech and based on the second speech being provided to the cloud server.

2. A method, comprising:
detecting first speech spoken within an environment of an assistant device;
determining, by a processor, that the first speech includes content having one or more words or phrases corresponding to a local dictionary of the assistant device;
generating a first interaction opportunity with the assistant device based on the one or more words or phrases of the first speech corresponding to the local dictionary, the first interaction opportunity being a first type of interaction opportunity based on the first speech including content having the one or more words or phrases corresponding to the local dictionary of the assistant device;

detecting second speech spoken within the environment of the assistant device, the first speech being different than the second speech;

determining that the second speech does not include the one or more words or phrases corresponding to the local dictionary;

providing the second speech to a cloud server to determine content or interactions related to the second speech;

receiving response data from the cloud server based on the content of the second speech; and generating a second interaction opportunity with the assistant device based on the response data received from the cloud server, the second interaction opportunity being a second type of interaction opportunity that is different than the first type of interaction opportunity, the second interaction opportunity being the second type based on providing the second speech to the cloud server.

3. The method of claim 2, wherein the cloud server is selected from among a first cloud server and a second cloud server based on the second speech, the first cloud server and the second cloud server corresponding to different services.

4. The method of claim 3, wherein the cloud server is selected based on characteristics of the second speech, the characteristics including one or more of time, content, complexity, or time duration.

5. The method of claim 2, wherein the first interaction opportunity includes providing additional information related to content of the first speech.

6. The method of claim 2, wherein the local dictionary includes information related to translating portions of the first speech into text.

7. The method of claim 2, wherein the local dictionary includes information related to commands capable of being performed by the assistant device.

8. The method of claim 2, wherein the first interaction opportunity is a speech response responsive to the first speech, and the second interaction opportunity is a visual response responsive to the second speech.

9. An assistant device, comprising:

one or more processors; and memory storing instructions, wherein the processor is configured to execute the instructions such that the processor and memory are configured to:

detect first speech spoken within an environment of the assistant device;

determine that the first speech includes content having one or more words or phrases corresponding to a local dictionary of the assistant device;

generate a first interaction opportunity with the assistant device based on the one or more words or phrases of the first speech corresponding to the local dictionary, the first interaction opportunity being a first type of interaction opportunity based on the first speech including content having the one or more words or phrases corresponding to the local dictionary of the assistant device;

detect second speech spoken within the environment of the assistant device, the first speech being different than the second speech;

determine that the second speech does not include the one or more words or phrases corresponding to the local dictionary;

provide the second speech to a cloud server to determine content or interactions related to the second speech;

receive response data from the cloud server based on the content of the second speech; and generate a second interaction opportunity with the assistant device based on the response data received from the cloud server, the second interaction opportunity being a second type of interaction opportunity that is different than the first type of interaction opportunity, the second interaction opportunity being the second type based on providing the second speech to the cloud server.

10. The assistant device of claim 9, wherein the cloud server is selected from among a first cloud server and a second cloud server based on the second speech, the first cloud server and the second cloud server corresponding to different services.

11. The assistant device of claim 10, wherein the cloud server is selected based on characteristics of the second speech, the characteristics including one or more of time, content, complexity, or time duration.

12. The assistant device of claim 9, wherein the first interaction opportunity includes providing additional information related to content of the first speech.

13. The assistant device of claim 9, wherein the local dictionary includes information related to translating portions of the first speech into text.

14. The assistant device of claim 9, wherein the local dictionary includes information related to commands capable of being performed by the assistant device.

15. The assistant device of claim 9, wherein the first interaction opportunity is a speech response responsive to the first speech, and the second interaction opportunity is a visual response responsive to the second speech.

16. A computer program product, comprising one or more non-transitory computer-readable media having computer program instructions stored therein, the computer program instructions being configured such that, when executed by one or more computing devices, the computer program instructions cause the one or more computing devices to:

detect first speech spoken within an environment of an assistant device;

determine that the first speech includes content having one or more words or phrases corresponding to a local dictionary of the assistant device;

generate a first interaction opportunity with the assistant device based on the one or more words or phrases of the first speech corresponding to the local dictionary, the first interaction opportunity being a first type of interaction opportunity based on the first speech including content having the one or more words or phrases corresponding to the local dictionary of the assistant device;

detect second speech spoken within the environment of the assistant device, the first speech being different than the second speech;

determine that the second speech does not include the one or more words or phrases corresponding to the local dictionary;

provide the second speech to a cloud server to determine content or interactions related to the second speech;

receive response data from the cloud server based on the content of the second speech; and generate a second interaction opportunity with the assistant device based on the response data received from the cloud server, the second interaction opportunity being a second type of interaction opportunity that is different than the first type of interaction opportunity, the second interaction opportunity being the second type based on providing the second speech to the cloud server.

17. The computer program product of claim 16, wherein the cloud server is selected from among a first cloud server and a second cloud server based on the second speech, the first cloud server and the second cloud server corresponding to different services.

18. The computer program product of claim 17, wherein the cloud server is selected based on characteristics of the second speech, the characteristics including one or more of time, content, complexity, or time duration.

19. The computer program product of claim 16, wherein the first interaction opportunity includes providing additional information related to content of the first speech.

20. The computer program product of claim 16, wherein the local dictionary includes information related to translating portions of the first speech into text.

21. The assistant device of claim 16, wherein the local dictionary includes information related to commands capable of being performed by the assistant device.

22. The computer program product of claim 16, wherein the first interaction opportunity is a speech response responsive to the first speech, and the second interaction opportunity is a visual response responsive to the second speech.

* * * * *